(12) United States Patent
Shiu et al.

(10) Patent No.: US 11,507,367 B2
(45) Date of Patent: Nov. 22, 2022

(54) FIRMWARE UPDATE METHOD AND FIRMWARE UPDATE SYSTEM THEREOF

(71) Applicant: Gunitech Corp., Qionlin Township, Hsinchu County (TW)

(72) Inventors: Huan-Ruei Shiu, Qionlin Township (TW); Hsin-Yi Kao, Qionlin Township (TW); Chung-Liang Hsu, Qionlin Township (TW); Xiao-Juan Lin, Qionlin Township (TW); Ming-Yi Wang, Qionlin Township (TW)

(73) Assignee: Gunitech Corp., Qionlin Township (TW)

( * ) Notice: Subject to any disclaimer, the term of this patent is extended or adjusted under 35 U.S.C. 154(b) by 0 days.

(21) Appl. No.: 16/885,910

(22) Filed: May 28, 2020

(65) Prior Publication Data

US 2021/0200532 A1    Jul. 1, 2021

Related U.S. Application Data

(60) Provisional application No. 62/953,653, filed on Dec. 26, 2019.

(51) Int. Cl.
*G06F 8/654* (2018.01)
*G06F 8/61* (2018.01)
(Continued)

(52) U.S. Cl.
CPC ............. *G06F 8/654* (2018.02); *G06F 8/30* (2013.01); *G06F 8/71* (2013.01); *G06F 21/572* (2013.01);
(Continued)

(58) Field of Classification Search
CPC ... G06F 8/654; G06F 8/30; G06F 8/71; G06F 8/65; G06F 8/63; G06F 8/658; G06F 8/60;
(Continued)

(56) References Cited

U.S. PATENT DOCUMENTS 9,842,210 B2 * 12/2017 Rose ..................... G06F 21/57
10,447,483 B1 * 10/2019 Su .......................... G06F 8/65
(Continued)

OTHER PUBLICATIONS

Tielei Wang et al., TaintScope: A Checksum-Aware Directed Fuzzing Tool for Automatic Software Vulnerability Detection, 2010 IEEE, [Retrieved on Jul. 11, 2022], Retrieved from the internet: <URL: https://ieeexplore.ieee.org/stamp/stamp.jsp?tp=&arnumber=5504701> 16 Pages (497-512) (Year: 2010).*
(Continued)

*Primary Examiner* — Anibal Rivera
(74) *Attorney, Agent, or Firm* — Alan D. Kamrath; Karin L. Williams; Mayer & Williams PC

(57) ABSTRACT

A firmware update method and a firmware update system thereof includes the steps of: executing a setting process, which includes writing a first identification code into a memory module, and setting a firmware update file on a firmware providing end to make the firmware update file include a second firmware image file and a second identification code and executing a determining process, which includes receiving the firmware update file and determining whether the firmware update file conforms to a custom structure according to the first identification code. If it does not, then prohibiting the firmware update image file from updating a computer system, and if it does, replacing a first firmware image file with the second firmware image file and writing the second firmware image file into the memory module of the computer system along with the second identification code.

10 Claims, 3 Drawing Sheets

(51) Int. Cl.
*G06F 21/57* (2013.01)
*G06F 8/71* (2018.01)
*G06F 21/73* (2013.01)
*G06F 8/30* (2018.01)
*G06F 21/64* (2013.01)
*G06F 21/56* (2013.01)
*G06F 8/658* (2018.01)
*G06F 8/60* (2018.01)
*G06F 8/65* (2018.01)

(52) U.S. Cl.
CPC .............. *G06F 21/64* (2013.01); *G06F 21/73* (2013.01); *G06F 8/60* (2013.01); *G06F 8/63* (2013.01); *G06F 8/65* (2013.01); *G06F 8/658* (2018.02); *G06F 21/56* (2013.01); *G06F 21/562* (2013.01); *G06F 21/57* (2013.01); *G06F 21/575* (2013.01)

(58) Field of Classification Search
CPC ........ G06F 21/572; G06F 21/64; G06F 21/73; G06F 21/562; G06F 21/56; G06F 21/86; G06F 21/44; G06F 21/575; G06F 21/62; G06F 3/123; G06F 8/61; G06F 21/57
See application file for complete search history.

(56) References Cited

U.S. PATENT DOCUMENTS

| | | | | |
|---|---|---|---|---|
| 10,509,908 | B2* | 12/2019 | Zarakas | G06F 8/654 |
| 2004/0015941 | A1* | 1/2004 | Sekine | G06F 8/65 |
| | | | | 713/300 |
| 2004/0103347 | A1* | 5/2004 | Sneed | G06F 11/1433 |
| | | | | 714/E11.135 |
| 2008/0040713 | A1* | 2/2008 | Subbakrishna | G06F 8/65 |
| | | | | 717/173 |
| 2010/0169709 | A1* | 7/2010 | Chiu | G06F 11/1004 |
| | | | | 711/E12.008 |
| 2015/0199517 | A1* | 7/2015 | Rose | G06F 21/562 |
| | | | | 726/22 |
| 2016/0291967 | A1* | 10/2016 | Badri | G06F 8/654 |
| 2018/0225459 | A1* | 8/2018 | Zarakas | G06F 21/86 |

OTHER PUBLICATIONS

N Asokan et al., ASSURED: Architecture for Secure Software Update of Realistic Embedded Devices, 2018 IEEE, [Retrieved on Jul. 11, 2022], Retrieved from the internet: <URL: https://ieeexplore.ieee.org/stamp/stamp.jsp?tp=&arnumber=8493602> 11 Pages (2290-2300) (Year: 2018).*

* cited by examiner

FIRMWARE UPDATE METHOD AND FIRMWARE UPDATE SYSTEM THEREOF

CROSS-REFERENCE TO RELATED APPLICATIONS

The present application claims priority from U.S. Provisional Patent Application No. 62/953,653 filed on Dec. 26, 2019.

BACKGROUND OF THE INVENTION

1. Field of the Invention

The present invention relates to a firmware update method and a firmware update system thereof, and more particularly, to a method and a firmware update system that can determine whether a firmware is legitimate.

2. Description of the Related Art

Firmware is a software embedded in a hardware device. There's already a function in the existing computer system that allows users to update the firmware. However, there is no way for the programs in the existing computer system to determine whether the firmware that the user wants to update is a firmware version compatible with the product. When a user uses an incorrect or insecure firmware update, it often results in the computer system not working properly or exhibiting unexpected behavior. Such a situation would generate unnecessary costs.

In the prior art, after compiling the firmware code, developers can re-define the name of the firmware image file according to the naming rules such as product category, version and so on. In addition, the tools used in the update are programmed to identify the file name, so as to verify the firmware version of the product and avoid updating the wrong firmware version. But the mechanisms in the prior art can only perform simple precautions. For those who familiar with the naming rules, they can easily write unknown firmware image files into the computer system by modifying the file name. As a result, the original file name discrimination mechanism becomes useless.

Therefore, it is necessary to propose a new firmware update method and a firmware update system thereof to solve the problems encountered in the prior art.

SUMMARY OF THE INVENTION

It is a main object of the present invention to provide a firmware update method that can determine whether a firmware is legitimate.

It is another object of the present invention to provide a firmware update system for the above method.

In order to achieve the above objects, the present invention provides a firmware update method for a firmware update system to enable a firmware providing end to update a computer system, wherein the computer system has a memory module and a first firmware image file written therein, the method comprising the following steps of: executing a setting process comprising: writing a first identification code into the memory module; and setting a firmware update file on the firmware providing end to make the firmware update file include a second firmware image file and a second identification code; and executing a determining process comprising: receiving the firmware update file; determining whether the firmware update file conforms to a custom structure according to the first identification code; if no, then prohibiting the firmware update image file from updating the computer system; and if yes, replacing the first firmware image file with the second firmware image file and writing the second firmware image file into the memory module of the computer system along with the second identification code.

The firmware update system of the present invention comprises a first setting module, a second setting module, a comparing module, and an update module. The first setting module is provided for writing a first identification code into the memory module. The second setting module is provided for setting a firmware update file on the firmware providing end to make the firmware update file include a second firmware image file and a second identification code. The comparing module, after receiving the firmware update file at the computer system, determines whether the firmware update conforms to a custom structure according to the first identification code. The update module is electrically connected to the comparing module, if the firmware update does not conform to the custom structure, that the second identification code does not conform to the custom structure, then prohibiting the firmware update image file from updating a computer system; if the firmware update conforms to the custom structure, replacing the first firmware image file with the second firmware image file and writing the second firmware image file into the memory module of the computer system along with the second identification code.

DETAILED DESCRIPTION OF THE PREFERRED EMBODIMENT

Hereafter, the technical content of the present invention will be better understood with reference to preferred embodiments.

Figure 1:
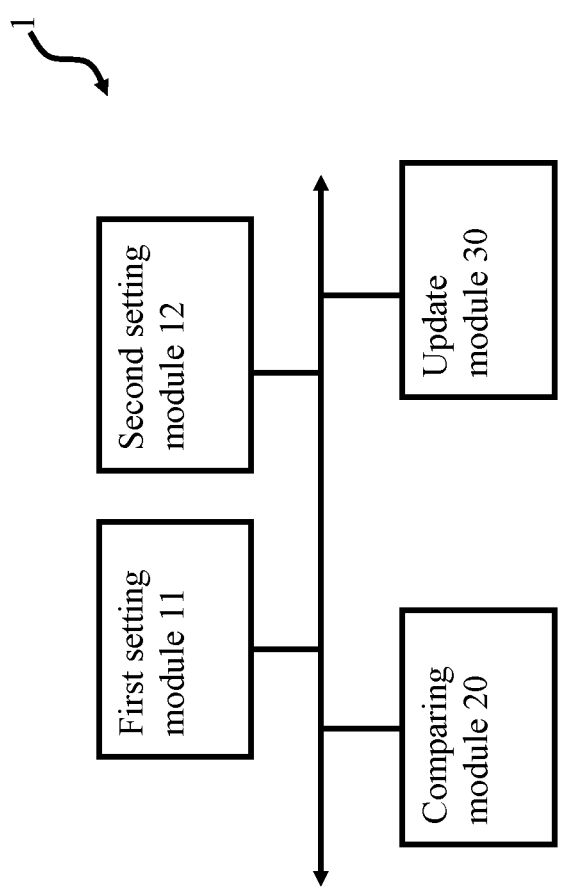
FIG. 1 illustrates a system architecture diagram of a firmware update system of the present invention.
Figure 2:
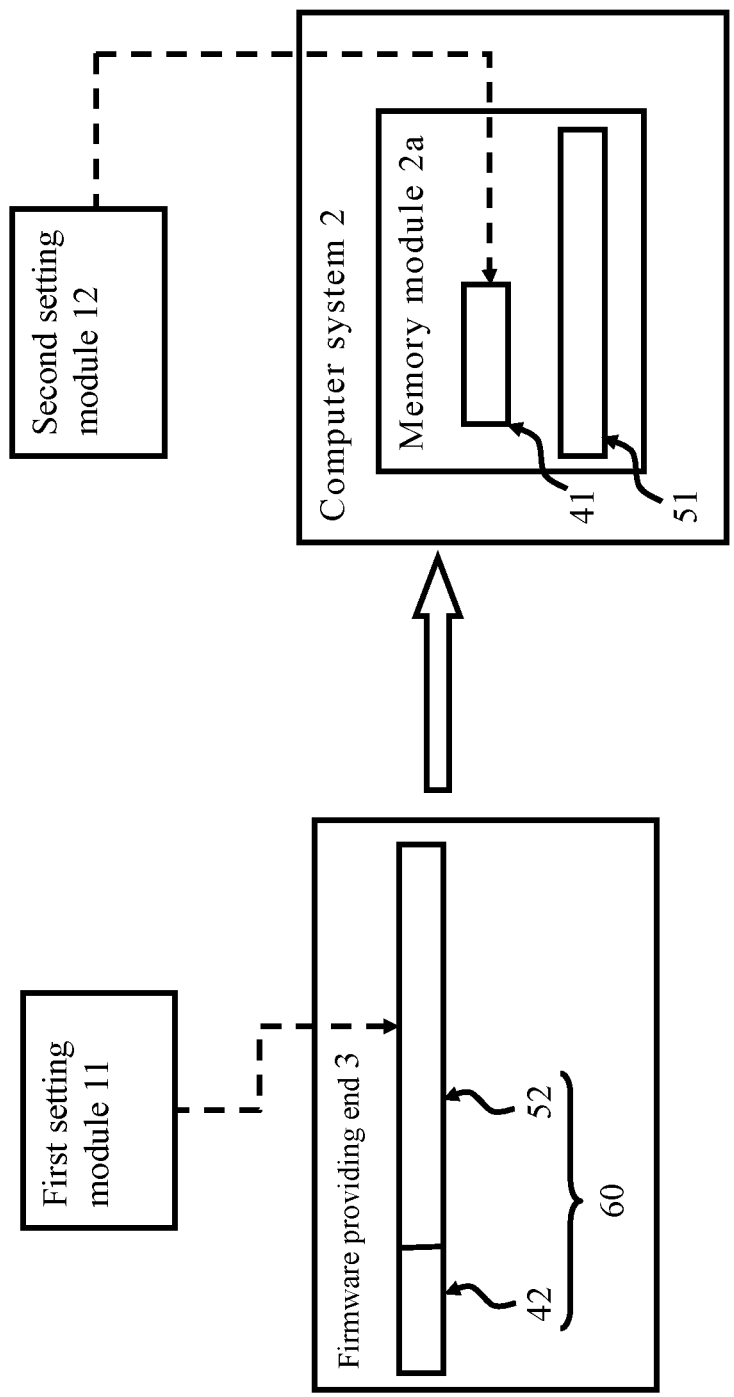
FIG. 2 illustrates a diagram showing the relationship between the firmware update system and the computer system of the present invention.

Please refer to FIG. 1 for a system architecture diagram of a firmware update system of the present invention and FIG. 2 for a diagram showing the relationship between the firmware update system and the computer system of the present invention.

The object of the firmware update system 1 of the present invention is to update the firmware in the computer system 2. The computer system 2 may be a desktop computer, a notebook computer, a smart phone, or a tablet computer that generally has an arithmetic processing function, as long as the system can support the firmware update function, it is within the scope of the present invention. The firmware update system 1 of the present invention can be used for updating any device of the computer system 2 and is not limited to the number of times of firmware updates, so it can be applied to one single device or a plurality of devices of the computer system. The computer system 2 has a memory module 2a for a first firmware image file 51 required by the computer system 2 to be written therein. The firmware to be updated is obtained from the firmware providing end 3, and the firmware providing end 3 may be a general hardware manufacturer, but the present invention is not limited thereto.

In an embodiment of the present invention, the firmware update system 1 includes a first setting module 11, a second setting module 12, a comparing module 20, and an update module 30. The first setting module 11 can be used in the computer system 2 to write a first identification code 41 into the memory module 2*a*. The second setting module 12 is used for the firmware providing end 3 to set the firmware update file 60 to be provided by the firmware providing end 3 so that the firmware update file 60 includes a second firmware image file 52 and a second identification code 42. The second firmware image file 52 is a firmware file that is actually used for updating the computer system 2. The second setting module 12 can add the second identification code 42 to the front end or the back end of the second firmware image file 52 to obtain the firmware update file. 60. In an embodiment of the present invention, the first setting module 11 and the second setting module 12 can generate the first identification code 41 and the second identification code 42 based on a software development kit (SDK) identification code, a product name, or a product serial number, but the invention is not limited thereto. In order to avoid malicious modification of the content of the identification code, the first setting module 11 and the second setting module 12 use a checksum calculation mechanism to generate the first identification code 41 and the second identification code 42.

After the second setting module 12 generates the second identification code 42, the firmware providing end 3 provides a firmware update file 60 including the second identification code 42 to the computer system 2. After the computer system 2 receives the firmware update file 60, the comparing module 20 uses the first identification code 41 stored in the memory module 2*a* of the computer system 2 to determine whether the firmware update file 60 conforms to a custom structure. The custom structure can include the content, length, or version defining the firmware image file. The comparing module 20 can be updated by using the Trivial File Transfer Protocol (TFTP), Over-the-Air Technology (OTA), HyperText Transfer Protocol (HTTP) of the computer system 2 to obtain a technology that can compare the firmware image file. However, the present invention is not limited to the use of the aforementioned technologies. Therefore, the comparing module 20 can compare the content of second identification code 42 with the content of first identification code 41, or the length of firmware update file 60 comprising the second firmware image file 52 or the second identification code 42 to determine whether it meets a set length. The comparing module 20 can also determine whether the version represented by the second identification code 42 has a newer version number. However, the present invention is not limited to the above manners.

The update module 30 is electrically connected to the comparing module 20. When the comparing module 20 determines that the firmware update file 60 and the included second identification code 42 do not conform to the custom structure, the update module 30 prohibits the firmware update file 60 from updating the computer system 2. When the comparing module 20 determines that the firmware update file 60 conforms to the custom structure and is a legitimate and safe firmware file. The update module 30 replaces the first firmware image file 51 of the computer system 2 with the second firmware image file 52 in the firmware update file 60. For example, after removing the second identification code 42 to obtain the second firmware image file 52, the second firmware image file 52 is written into a correct location in the memory module 2*a* of the computer system 2 to replace the first firmware image file 51, and the second identification code 42 is also written into the memory module 2*a*, thereby completing updating the computer system 2.

It is noted that each module included in the firmware update system 1 can be constructed as a hardware device, a software program combined with a hardware device, or a firmware combined with a hardware device. For example, a computer program product can be stored in a computer-readable medium to read and execute various functions of the invention, but the invention is not limited to the above-mentioned manner. Furthermore, this embodiment only exemplifies the preferred embodiments of the present invention. In order to avoid redundant descriptions, all possible combinations of changes are not described in detail. However, those skilled in the art should understand, that the above modules or components may not be necessary. In order to implement the present invention, other more detailed conventional modules or components may also be included. Each module or component may be omitted or modified as required, and there may not be other modules or components between any two modules.

Figure 3:
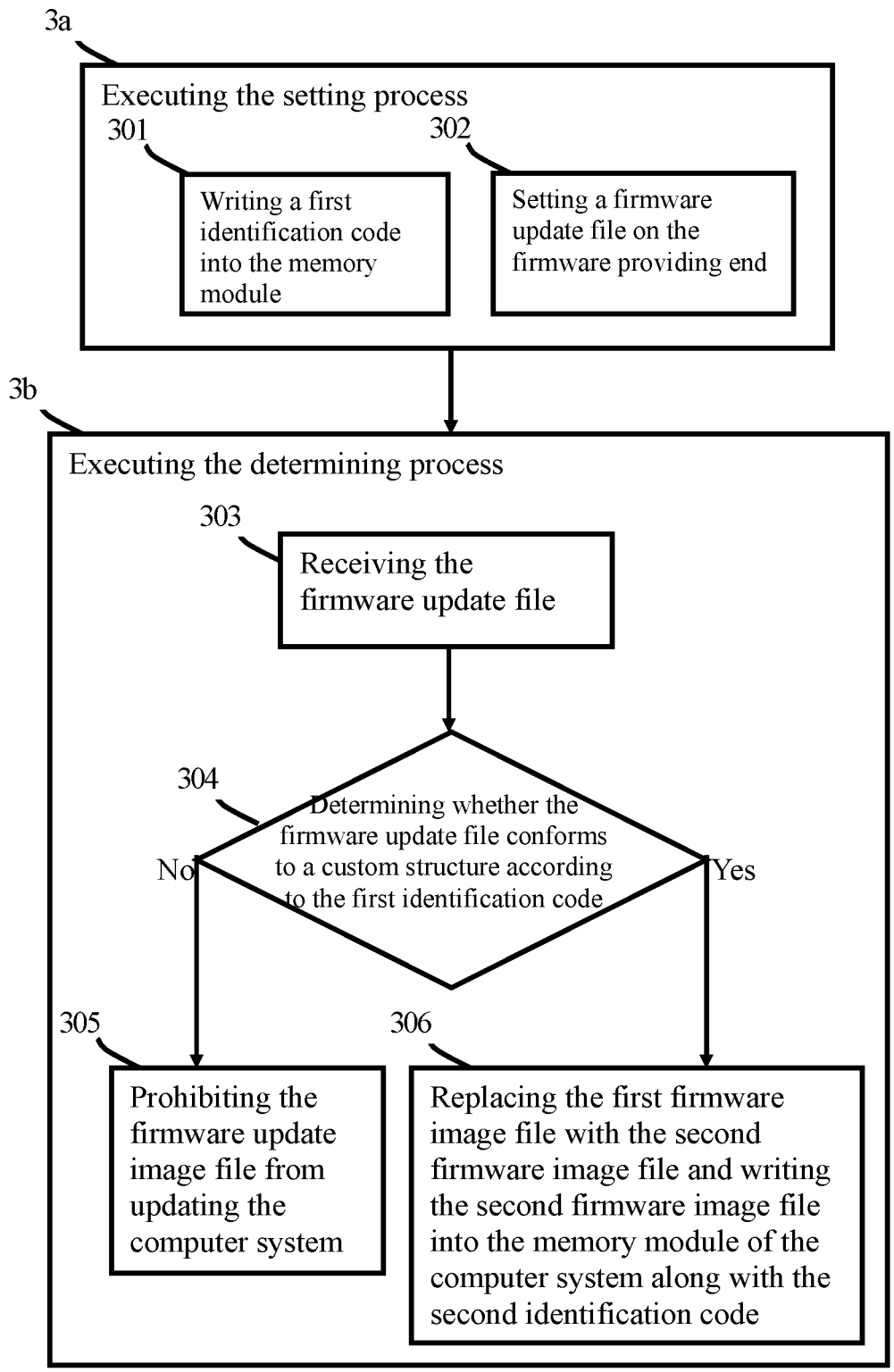
FIG. 3 illustrates a flowchart of the steps of the firmware update method of the present invention.

Please refer to FIG. 3 for a flowchart of the steps of the firmware update method of the present invention. It is noted that although the firmware update system 1 described above is used as an example to describe the firmware update method of the present invention, the firmware update method of the present invention does not necessarily use the same structure of the firmware update system 1 as described above.

The firmware update method of the present invention first proceeds to step 3*a* for executing a setting process, at step 301: writing a first identification code into the memory module.

First, the first setting module 11 is used for writing the first identification code 41 into the memory module 2*a* of the computer system 2. The first setting module 11 can use a checksum calculation mechanism to generate the first identification code 41 according to the software development kit (SDK) identification code, product name, or product serial number, but the first identification code of the present invention can be generated using methods other than the above-mentioned generation method.

In the meantime, step 302 is also executed: setting a firmware update file on the firmware providing end.

At the same time, the second setting module 12 sets the firmware update file 60 to be provided at the firmware providing end 3, so that the firmware update file 60 includes the second firmware image file 52 and the second identification code 42. The second setting module 12 can also use the checksum calculation mechanism to generate the second identification code 42 based on the same software development kit (SDK) identification code, product name or product serial number as that of the first identification code 41, and then add the second identification code 42 to the front end or back end of the second firmware image file 52 to obtain the firmware update file 60.

After the setting process of the above steps 301 and 302 is completed, and then as the computer system 2 is about to execute the firmware update, the firmware update system 1 proceeds to step 3*b* to execute the determining process, at step 303: receiving the firmware update file.

At this time, the firmware providing end 3 provides the firmware update file 60 including the second identification code 42 to the computer system 2, and the comparing module 20 has to determine whether the firmware update file 60 is legitimate and safe.

Therefore, the method proceeds to step 304: determining whether the firmware update file conforms to a custom structure according to the first identification code.

The comparing module 20 uses the first identification code 41 stored in the memory module 2*a* of the computer system 2 to determine whether the firmware update file 60 conforms to the custom structure. The custom structure can include the content, length, or version defining the firmware image file, but the present invention is not limited thereto.

If the firmware update file does not conform to the custom structure, then the method proceeds to step 305: prohibiting the firmware update image file from updating the computer system.

At this time the update module 30 will prohibit the firmware update image file 60 from updating the computer system 2.

If the firmware update file conforms to the custom structure, then the method proceeds to step 306: replacing the first firmware image file with the second firmware image file and writing the second firmware image file into the memory module of the computer system along with the second identification code.

At this time the update module 30 removes the second identification code 42 to obtain the second firmware image file 52, and then writes the second firmware image file 52 into a correct location in the memory module 2*a* of the computer system 2 to replace the first firmware image file 51, and the update module 30 also writes the second identification code 42 into the memory module 2*a*, thereby completing updating the computer system 2.

It is noted that the firmware update method of the present invention is not limited to the above sequence of steps. As long as the objects of the invention are achieved, the above sequence of steps may be changed.

By using the firmware update method and firmware update system 1 of the present invention, it is possible to ensure that the firmware for updating the computer system 2 is legitimate and safe, and avoid causing damage to the computer system 2.

As described above, the objective, means, and efficiency of the present invention are all different from conventional characteristics in the prior art. It will be appreciated if the committee can review and grant a patent to benefit the society. However, it should be noted that the embodiments of the present invention described above are only illustrative. All without departing from the scope of the invention are defined solely by the appended claims.

What is claimed is:

1. A firmware update method for a firmware update system to enable a firmware providing end to update a computer system, wherein the computer system has a memory module and a first firmware image file written therein, the method comprising the following steps of:
   executing a setting process, comprising:
   writing a first identification code into the memory module; and
   setting a firmware update file on the firmware providing end, the firmware update file including a second firmware image file and a second identification code, wherein the second identification code is added to either one of the front end or the back end of the second firmware image file to obtain the firmware update file; and
   executing a determining process, comprising:
   receiving the firmware update file;
   determining whether the firmware update file conforms to a custom structure according to the first identification code so as to determine whether the second identification code of the firmware update file has a newer version number;
   if no, then prohibiting the firmware update image file from updating the computer system; and
   if yes, replacing the first firmware image file with the second firmware image file and writing the second firmware image file into the memory module of the computer system along with the second identification code.

2. The firmware update method as claimed in claim 1 further comprising the following step of:
   generating the first identification code and the second identification code according to a software development kit (SDK) identification code, a product name, or a product serial number.

3. The firmware update method as claimed in claim 1 further comprising the following step of:
   generating the first identification code and the second identification code according to a checksum calculation mechanism.

4. The firmware update method as claimed in claim 3, wherein the step of determining whether the firmware update file conforms to the custom structure further comprises:
   determining whether the second identification code of the firmware update file conforms to the first identification code; and
   if yes, removing the second identification code from the firmware update file to convert the firmware update file into the second firmware image file.

5. The firmware update method as claimed in claim 4, wherein the step of determining whether the firmware update file conforms to the custom structure further comprises:
   determining whether a length of the firmware update file conforms to a set length.

6. A firmware update system to enable a firmware providing end to update a computer system, wherein the computer system has a memory module and a first firmware image the written therein, the firmware update system comprising:
   a first setting module for writing a first identification code into the memory module;
   a second setting module for setting a firmware update file on the firmware providing end, the firmware update file including a second firmware image file and a second identification code, wherein the second setting module adds the second identification code to either one of the front end or the back end of the second firmware image file to obtain the firmware update file;
   a comparing module, after receiving the firmware update file at the computer system, determining whether the firmware update file conforms to a custom structure according to the first identification code so as to determine whether the second identification code of the firmware update file has a newer version number; and
   an update module electrically connected to the comparing module; wherein if the firmware update file does not conform to the custom structure, then the update module prohibits the firmware update image file from updating the computer system;
   if the firmware update file conforms to the custom structure, then the update module replaces the first firmware image file with the second firmware image file and writes the second firmware image file into the memory module of the computer system along with the second identification code.

7. The firmware update system as claimed in claim 6, wherein the first setting module and the second setting module generate the first identification code and the second identification code according to a software development kit (SDK) identification code, a product name, or a product serial number.

8. The firmware update system as claimed in claim 6, wherein the first setting module and the second setting module generate the first identification code and the second identification code according to a checksum calculation mechanism.

9. The firmware update system as claimed in claim 8, wherein the comparing module determines whether the second identification code of the firmware update file conforms to the first identification code; if yes, the update module removes the second identification code from the firmware update file to convert the firmware update file into the second firmware image file.

10. The firmware update system as claimed in claim 9, wherein the comparing module further determines whether a length of the firmware update file conforms to a set length.

* * * * *